United States Patent [19]

Conlon

[11] Patent Number: 4,640,572
[45] Date of Patent: Feb. 3, 1987

[54] CONNECTOR FOR STRUCTURAL SYSTEMS

[76] Inventor: Thomas R. Conlon, P.O. Box 88810, Honolulu, Hi. 96815

[21] Appl. No.: 640,044

[22] Filed: Aug. 10, 1984

[51] Int. Cl.$^4$ .......................................... H01R 11/22
[52] U.S. Cl. ........................... 339/252 R; 339/253 R; 339/242; 403/195; 403/297
[58] Field of Search ........... 339/252 R, 252 P, 253 R, 339/253 S, 74 R, 242, 267; 52/648, 646, 70; 403/297, 195, 252, 255

[56] References Cited

U.S. PATENT DOCUMENTS

| | | | |
|---|---|---|---|
| 3,270,314 | 8/1966 | Kohanek et al. | 339/252 P |
| 3,444,505 | 5/1969 | Becker | 339/242 |
| 3,811,785 | 5/1974 | Hagglund | 403/297 |
| 4,131,376 | 12/1978 | Busse | 403/297 |
| 4,494,719 | 1/1985 | Guidicelli | 403/195 |

FOREIGN PATENT DOCUMENTS 1020077 11/1957 Fed. Rep. of Germany ...... 339/267

Primary Examiner—Eugene F. Desmond
Assistant Examiner—Paula A. Austin

[57] ABSTRACT

A connecting mechanism for structural building system components for supporting radial, compression and tension loads by use of a captive, expanding/contracting jaw assembly which is caused to extended from an opening in the end of the connecting member into a connecting port located in the attaching component. The jaw assembly is then caused to expanded outward and to lock into the connecting port of the attaching component. Operation of the connecting mechanism is performed by causing an operating sleeve, which is located on the outside diameter of the connecting member, to be moved. This causes a structural bond to be made which firmly joins the connecting member and the attaching component. The procedure is reversed for simple removal of structural components or disassembly of the structure whenever desired.

14 Claims, 7 Drawing Figures

CONNECTOR FOR STRUCTURAL SYSTEMS

BACKGROUND OF THE INVENTION

1. Field of the Invention

This invention relates generally to a connecting mechanism for structural members and components and more particularly to a novel expanding/contracting jaw connecting mechanism for structural members and components requiring rapid erection by either automated means or by hand, without requiring the use of any tools.

2. Background

Structural building systems of the space frame type are of great value when used in the construction of large structures, typically of the industrial or municipal type, and structures requiring erection in outer space. Structures of this type provide high strength, light weight, simple operation, versatile design capability, adaptability and modularity. Usually, such structures are made from sections of metallic tubing referred to here as the "connecting member" which has a provision on both ends for connecting to multifaceted unions referred to here as the "attaching component". The attaching component is usually provided with up to 18 "connecting ports" for fixing the attaching component to the ends of connecting members.

Most spaceframe type building system connectors fall into two basic categories of connecting members and attaching components. In the first category the connecting members and attaching components are assembled on jigs and fixtures and then permanently welded together. They are typically quite heavy and are used for structures which are intended to be permanent and will not require modification at a later date.

The second category uses a multitude of various types of screw thread or bolt arrangements to join the connecting members and attaching components. One type of design holds the bolt captive in the connecting member and has provisions for allowing the bolt to be manually threaded into the connecting port of the attaching component thereby causing the connecting member and attaching component to become fixed together. Another type uses hollow attaching components which can be opened up to provide internal access to the connecting ports for the purpose of threading bolts through the connecting ports and into a nut which is fixed in the ends of the connecting member.

There is another type of connector which uses attaching components formed from metal stampings and formed connecting members made of sheet metal. This type of connector is either bolted or riveted together.

Other connector designs exist, however they are of light construction and design and are used primarily for models, toys and light weight display applications.

A variety of drawbacks and design deficiencys limit the capabilities of exhisting structural connecting systems. One problem is the use of bolts and screw threads as the prime means of connection. Systems of this type require accurate alignment of the bolts and bolt holes in order to be able to insert the bolts. Once the bolts have been inserted in the proper holes, or they have been accurately lined up with the respective threaded hole, nuts must then be positioned for the bolts to engage. The bolt thread and nut thread must be accurately aligned and then either the bolt or the nut must be caused to rotate in order to engage and tighten the threads. The above mentioned operations require the use of manual labor and hand held and operated tools and requires maintaining a supply of nuts, bolts and small related hardware as well as structural components and the necessary hand tools, close at hand, at the point where assembly is occurring. This is usually in an awkward and difficult position where it is easy to drop and lose tools and parts. This process is both time consuming and difficult to carry out.

Another problem is encountered when attempting to erect structures by means of automated devices. Connector systems as shown in prior art are not well suited for use with automated assembly equipment because of the problems involved in storing, gripping, holding, positioning, manipulating, aligning, registering and operating the various components and parts required to complete the structural connection.

3. Description of the Prior Art

Structural connecting systems which have hitherto been constructed in accordance with prior art have used rivets and welded joints. More recently, screw type threads to bind and connect structural components have been used, as are shown in U.S. Pat. Nos. 3,789,562 4,313,687 4,438,615 4,353,662 3,995,962 3,982,841 and 4,027,449. These designs are subject to the problems and difficulties as stated above.

U.S. Pat. No. 4,359,960 describes a "Marine Tethering Device" using an expanding jaw principal as do U.S. Pat. Nos. 3,638,988 describing a "latch assembly for well tools" and 4,132,147 describing "Store retention and release mechanism" for holding and releasing bombs on the wings of aircraft. These patents show expanding jaw principals for connecting parts, however they are clearly not intended, or satisfactory for use as structural systems connectors. The method of operating the jaw expansion mechanism in these designs, has significant variations from the method described hearin.

One important difference is that these designs do not incorporate an extendible/retractable jaw assembly and therefore are not capable of being used satisfactorily as a building system connector. My extendible/retractable jaw connector allows a connecting member to be placed into, or removed from an existing structure without requiring any movement of the attaching components.

Another important difference is that the component which causes jaw expansion to occur is pulled into the jaw cluster which is the opposite of my technique in which the component which causes the jaw assembly to expand is pushed into the jaw assembly causing the jaw cluster to expand and secure the connection of the connecting member and the attaching component.

U.S. Pat. No. 4,129,975 describes a "Construction Set Having Clip Fasteners". This invention uses a plastic clip with 2 jaws formed in each end of the connecting member and oblong holes located in the attaching component. This invention also has no provision for extendible/retractable jaws. This prohibits the insertion or removal of any connecting members and attaching components from between any connecting members and attaching components in an assembled structure.

Additionally, the above referenced patent does not incorporate any captive locking pin or external operating sleeve. Also, the quantity of jaws used at each connecting point is limited to two, which are diagonally mounted. This limits the strength of the connector and requires the accurate radial alignment of the two jaws of the connecting member and the oblong hole in the attaching component.

My connecting mechanism overcomes the above state problems and provides additional benefits and refinements by incorporating an extendable/retractable jaw assembly which allows connecting members and attaching components to be installed and removed from any position of an assembled structure without requiring disassembly or removal of any other structural member.

Additionally, my connecting mechanism is fully secured by a simple movement of the operating sleeve which causes the jaws to extend out of the end of the connecting member and into the connecting port of the attaching component and additionally, causes the captivly held locking pin to slide forward and expand the jaw assembly, firmly locking the connecting member to the attaching component.

Additionally, my connecting mechanism is fully operable without requiring the use of any tools and it incorporates the necessary provisions to allow complex structures to be assembled by fully automatic devices in extremely short periods of time. My connector also is able to be used with structural components that can be assembled from, and disassembled into magazines for storage, shipping and use with the previously mentioned automatic assembly/disassembly devices.

Furthermore, my connecting mechanism has the necessary provisions for incorporating internal electrical connections to be installed in both the connecting member and the attaching component, allowing the structure to function as an electrical transmission grid, allowing an electrical connection to be made at any unused connecting port in any attaching component.

My connector is simple to make and to use and provides a connecting mechanism having a combination of features and advantages that are unique to the industry.

OBJECT OF THE INVENTION

The main purpose of this invention is to provide a means of connecting structural components in a simple, rapid, precise, and strong manner.

Another purpose is to provide a connector system which is designed to allow the use of rapid, economical production technology and the use of inexpensive materials.

Another purpose is to provide a means of connecting structural components that requires only the use of the hands, without requiring the use of any tools.

Another purpose is to provide a means of connecting structural components which can be fully secured and released by moving only one part.

Another purpose is to provide a means of connecting structural components which can be used with automated assembly devices.

Another purpose is to provide a structural connecting system which can be built in a variety of scales for satisfing the needs of a wide range of applications.

Another purpose is to provide a structural connecting system which can be used for constructing structures in the regions of outer space.

Another purpose is to provide a structural connecting system which can be used with storage magazines which incorporate the necessary design provisions for accurate, progressive storage and simple loading and unloading of all attaching components and structural members by hand or by automated means.

Another purpose is to provide a structural connecting system which is easily assembled by workers who are required by the nature of the working environment to wear large or bulky gloves.

Another purpose is to provide a structural connecting system which is capable of supporting internal electrical connections.

Another purpose is to provide a structural connecting system which is capable of maintaining close dimensional tolerance of all attaching components and structural members without requiring any adjustments.

Another purpose is to provide a structural connecting system which utilizes a connecting port which can be incorporated into or on an object, part or fixture allowing said object, part or fixture to become fixed to the ends of the connecting members.

DESCRIPTION OF THE INVENTION

Figure 1:
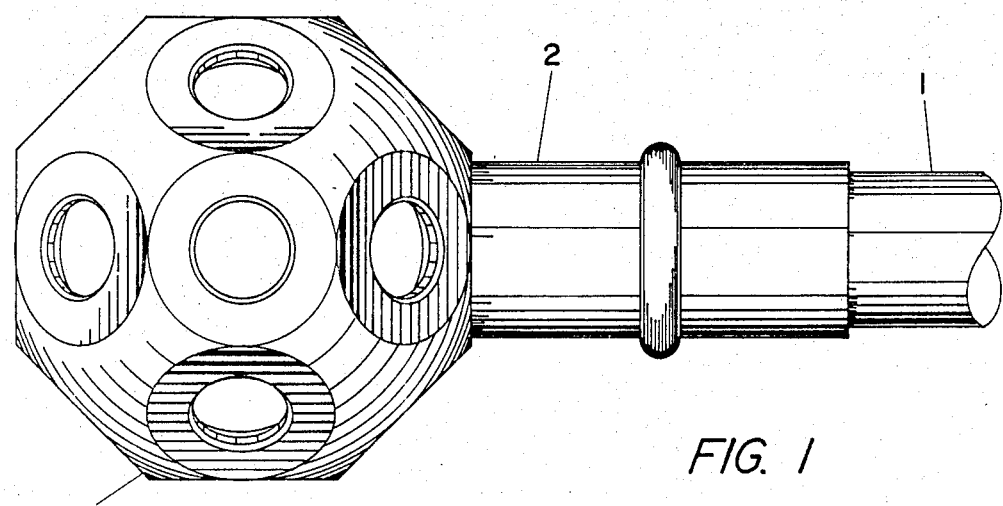
FIG. 1 is an external view of the ends of the connecting member 1, operating sleeve 2, and attaching component 14.
Figure 2:
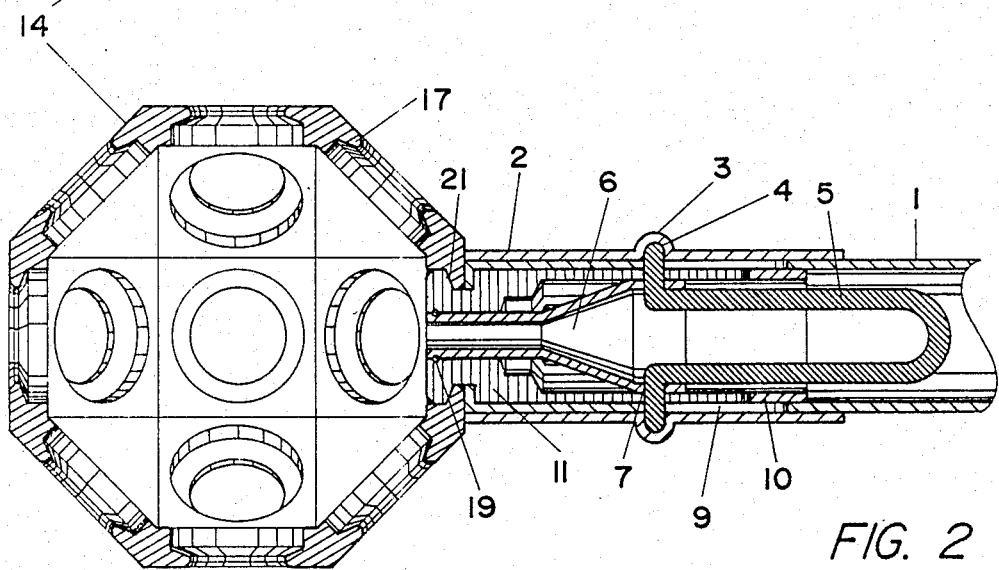
FIG. 2 is a sectional view of FIG. 1 showing the position of the connecting mechanism in the fully secured position.
Figure 4:
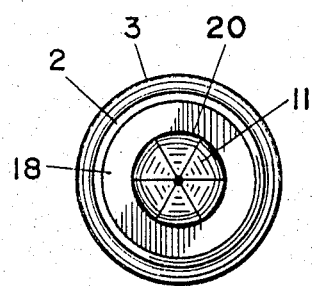
FIG. 4 is an external end view of the connecting member 1 in the disconnected position.
Figure 3:
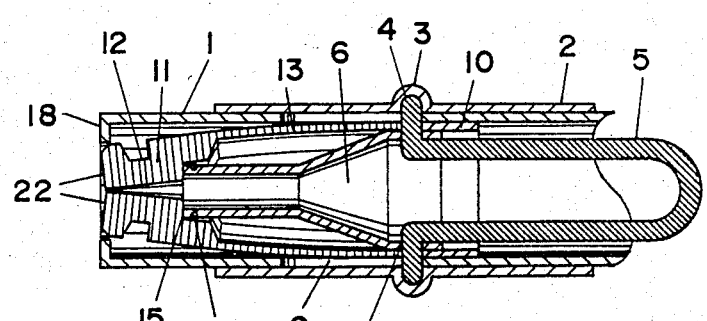
FIG. 3 is a sectional view of the connecting mechanism in the disconnected position with jaws 11 contracted and retracted into the connecting member.
Figure 5A:
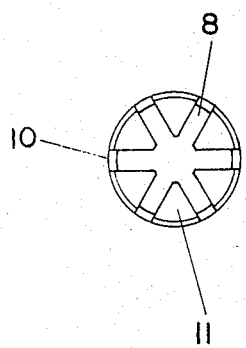
FIG. 5a is an end view of jaw assembly 10.
Figure 5B:
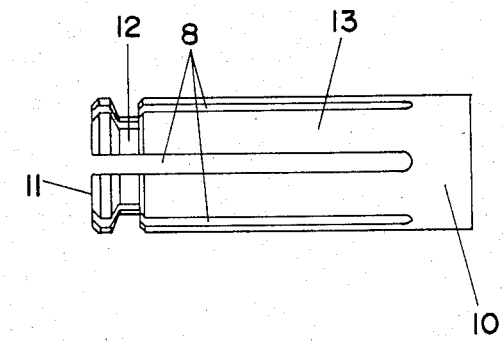
FIG. 5b is an elevational view of the jaw assembly 10.
Figure 6:
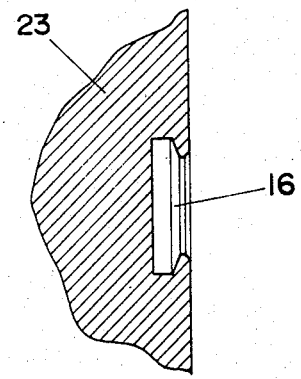
FIG. 6 is a sectional view of connecting port 16 as used in conjunction with an object, part or fixture 23.

The structural member 1 being typically of a tubular form contains the connecting mechanism in one or both ends of said structural member 1. The operating sleeve 2 may have an upset rib 3 in the form of one or more bands that encircle the outside diameter of said operating sleeve 2 for the purpose of increasing gripability and for providing the necessary space for groove 4 which is located in the inside diameter of said operating sleeve 2. When the operating sleeve 2 is moved towards the attaching component 14, the pin spring 5 which is held captive in groove 4 in sleeve 2 is moved towards the attaching component in unison with the operating sleeve 2. The pin spring 5 is made of round wire possessing spring like qualities and is of a horse shoe like shape which allows it to be flexed in a manner allowing it to be installed in locking pin holes 7, slots 8 in jaw assembly 10, slots 9 in connecting member 1 and in the groove 4 of operating sleeve 2. The locking pin 6 is held captive to pin spring 5, by the two holes 7 in the large diameter through which the pin spring 5 passes. The locking pin 6, when caused to be moved towards the attaching component by the movement of the operating sleeve 2 and pin spring 5, is caused to push with the tip of its small diameter 15 against the jaws 11 causing the jaws 11 to move out of the end of the connecting member and into the opening of the connecting port 16. The connecting port 16 can be formed on or into any object, part or fixture 23 FIG. 6 allowing said object, part or fixture to be fixed to the ends of said connecting members. The jaw assembly 10 which is typically cylindrical in form has two or more jaws 11. The jaws have a groove 12 located radially in the outward most end of the outside diameter of said cylindrical form and two or more slots 8 cut linearly throughout the majority of its length, forming jaws on the ends of flexible arms 13. The jaws 11 are held captive in the connecting member 18 by the formed face and shoulder 18. The jaw assembly can be made to expand only when the jaw assembly is caused to be fully extended from the end of structural member 1 by the movement of locking pin 6 and the jaw groove 12 comes into alignment with the connecting member shoulder 18 and the shoulder 17 at the opening of the connecting port 16. Continued movement of the operating sleeve 2 towards the attaching component causes the locking pin 6 to be moved through an opening between the jaws, causing them to expand outward, which firmly locks the jaw groove 12 onto shoulder 17 of the connecting port 16. Locking pin 6 is composed of two hollow cylindrical tube like forms, one of small diameter and one of large diameter connected by a conical section. The locking pin 6 is hollow to provide the necessary space for installing an integral electrical connection.

Once the connecting mechanism is in the fully secured position, it is held there by the detent spring 19 which is located in a groove near the tip of the lock pin 6. The detent spring springs radially outward into a shallow groove located near the tip of the jaws when the detent spring 19 on the locking pin 6 and the shallow groove in the jaws are brought into alignment, causing all components to be held in the secured position. The detent spring 19 can be located at a variety of locations to allow various detent strengths to be provided.

To disconnect the connecting member from the attaching component, the operating sleeve 2 is caused to be moved away from the attaching component, causing the pin spring 5 to also be moved away from the attaching component, which causes the locking pin 6 to be moved away from the attaching component, once enough force is provided in moving the operating sleeve to over come the restraining force being applied by the detent spring. Once the restraining force being applied by detent spring 19 is overcome, the locking pin 6 is caused to withdraw from its locking position between the jaws 11. When the locking pin 6 is fully withdrawn, the jaws 11 are free to contract. Further movement of the operating sleeve 2 away from the attaching component causes the pin spring 5 to engage the jaw assembly 10 at the end of the jaw slots 8 causing the jaws 11 to be pulled out of the connecting port 16 of the attaching component and into the connecting member through connecting member opening 20. The jaws 11 are caused to contract and clear the shoulder 17 in the connecting port 16 by the angular force applied at face 21 when the jaws 11 are caused to withdraw. Once the jaws 11 are fully withdrawn into connecting member 1, they rest in the withdrawn position 22 on the edge of face 18 until they are used again.

A variation of the above decribed structural connector exhists when the basic design of the connector is inverted whereby the jaws would be caused to contract around a projecting mushroom shaped lug and shoulder on the attaching component by mounting the locking pin on the outside diameter of the jaw assembly.

While in the foregoing there have been described several preferred embodiments of the invention, it should be understood that various changes and modifications can be made without departing from the true spirit and scope of the invention as recited above and in the appended claims.

I claim:

1. In a structural system including an attaching component provided with at least one connecting port, a structural component, and a coupling mechanism adapted to attach said structural component to said connecting port of said attaching component; an improved coupling mechanism comprising:
   an elongated jaw assembly disposed coaxially within said structural component proximate an end thereof and movable between an extended and a retracted position, said jaw assembly including a plurality of radially expansible jaws adapted to engage an inner perimeter of said connecting port when they are extended out of said end of said structural component to said extended position;
   an elongated locking pin disposed coaxially within said jaw assembly, said locking pin being movable between a locked and unlocked position, where moving said locking pin from said unlocked position to said locked position causes said jaw assembly to move from said retracted to said extended position, and where moving said locking pin from said locked position to said unlocked position causes said jaw assembly to move from said extended position to said retracted position;
   an operating sleeve disposed around said end of said structural component; and
   means connecting said operating sleeve to said locking pin such that movement of said operating sleeve causes a corresponding movement of said locking pin.

2. An improved coupling mechanism as recited in claim 1 wherein said elongated jaw assembly includes a base portion and a plurality of flexible finger portions extending from said base portion, said jaws being formed at the free ends of said finger portions.

3. An improved coupling mechanism as recited in claim 2 wherein said locking pin includes a main body portion and a cylindrical extension coupled to said main body portion, said cylindrical extension being operative to push said jaw assembly from said retracted to said extended position, and then to prevent said jaws from closing when said jaw assembly is in said extended position.

4. An improved coupling mechanism as recited in claim 3 further comprising a detent mechanism which locks said jaw assembly to said locking pin when said jaw assembly is in said extended position and said locking pin is in said locking position.

5. An improved coupling mechanism as recited in claim 3 wherein said locking pin is hollow such that wires and the like can be passed through said coupling mechanism.

6. An improved coupling mechanism as recited in claim 3 wherein means for connecting said operating sleeve to said locking pin includes a connecting member extending through a slot provided in said structural component.

7. An improved coupling mechanism as recited in claim 6 wherein said connecting member is a U shaped pin spring having a foot which engages said operating sleeve and said locking pin, and which extends between an adjacent pair of said fingers of said jaw assembly.

8. A structural system comprising:
   an attaching component provided with a connecting port; and
   a connecting assembly including an elongated support member, a jaw assembly disposed within an end of said support member, and a locking pin disposed within said jaw assembly, where said jaw assembly includes a plurality of radially expansible jaws which are adapted to expand to engage an inner perimeter of said connecting port when they are extended out of said end of said support member in an extended position, and where said locking pin is adapted to slide between said jaws when they are in said extended position to prevent said jaws from moving radially inwardly.

9. A structural system as recited in claim 8 wherein said jaw assembly includes a base portion and a plurality of fingers extending from said base portion, where said jaws are formed at the free end of said plurality of fingers.

10. A structural system as recited in claim 8 further comprising detent means coupled between said jaw assembly and said locking pin to retain said locking pin in said locked position.

11. A structural system as recited in claim 8 further comprising an operating sleeve telescoped over said support member, and means connecting said operating sleeve to said locking pin, such that moving said operating sleeve causes said locking pin to move between a locked position between said jaws and an unlocked position where said jaws may move radially inwardly.

12. A structural system as recited in claim 11 where said means connecting said operating sleeve to said locking pin extends through a slot provided in said support member.

13. A structural system as recited in claim 8 wherein said attaching component is substantially hollow and spherical in configuration, and where said attaching component is provided with a plurality of connecting ports spaced around its surface.

14. A structural system as recited in claim 13 wherein the outer surface of said attaching component is faceted proximate said connecting ports.

* * * * *